Jan. 15, 1935.  G. A. GRAHAM ET AL  1,987,617
ANEMOMETRY AND GAS FLOW METER
Filed Aug. 18, 1931    2 Sheets-Sheet 1
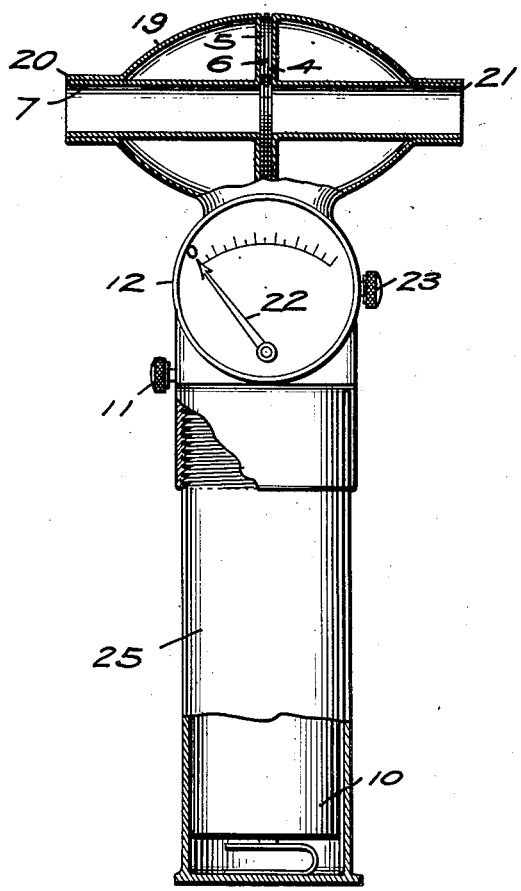
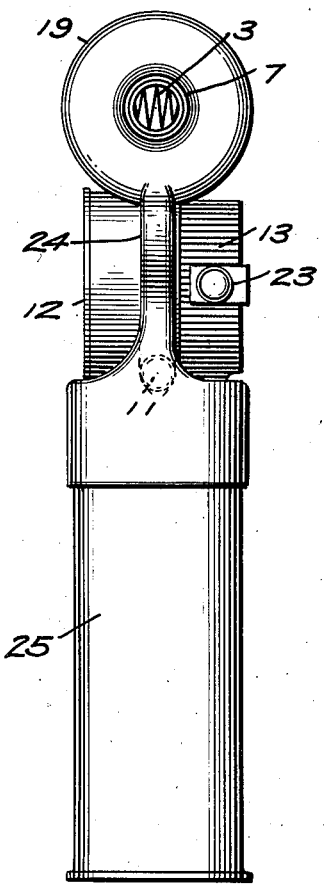
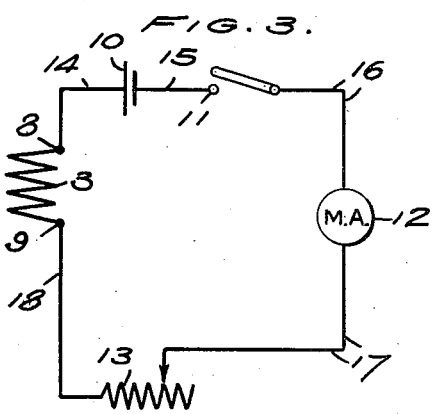
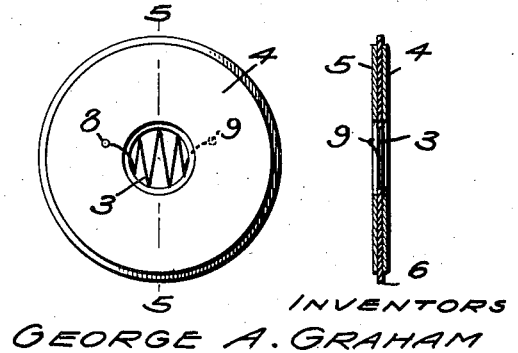
INVENTORS
GEORGE A. GRAHAM
JAMES W. GOODIN
BY Robert H. Young
ATTORNEY Jan. 15, 1935.   G. A. GRAHAM ET AL   1,987,617
ANEMOMETRY AND GAS FLOW METER
Filed Aug. 18, 1931   2 Sheets-Sheet 2
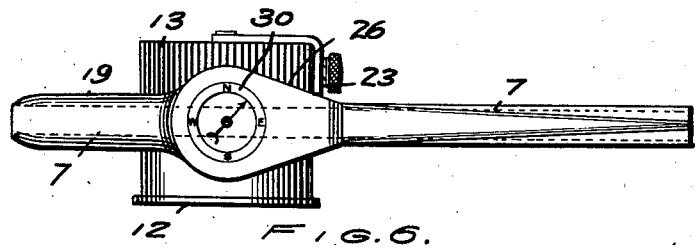
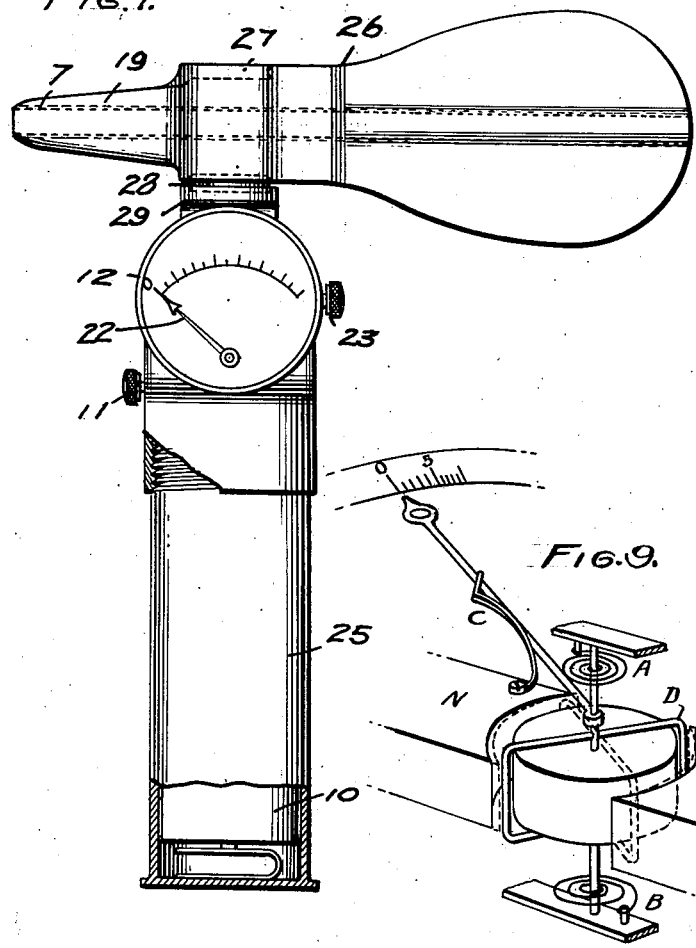
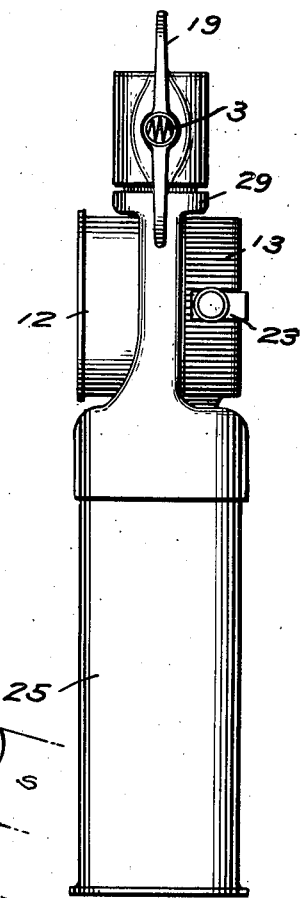
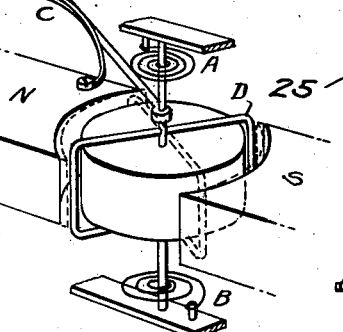
INVENTORS
GEORGE A. GRAHAM
JAMES W. GOODIN
BY Robert H. Young
ATTORNEY

UNITED STATES PATENT OFFICE 1,987,617

ANEMOMETRY AND GAS FLOW METER

George A. Graham and James W. Goodin, Long Branch, N. J.

Application August 18, 1931, Serial No. 557,837

8 Claims. (Cl. 73—2)

(Granted under the act of March 3, 1883, as amended April 30, 1928; 370 O. G. 757)

This invention relates to anemometry and proposes means of measuring the velocity of the wind, or of determining the rate of flow of any gas per unit of time.

One of the main objects of this invention is to provide a means of measuring the velocity of the wind or air movement.

Another main object of this invention is to provide a means for measuring the velocity of the wind or air movement in such a manner as to faithfully reproduce and to give uniformly rectilinear or straight line indication of the slightest acceleration or deceleration in this velocity. The means used are such as to reduce to a minimum all elements of mechanical friction and inertia such as have limited the efficiency of previous devices.

Another important object of the invention is to provide an anemometer in a small compact form such as to be readily portable and capable of being held in one hand, which is adapted for measuring the velocity of the wind, or other gas movement, at any instant or over a period of time.

Another object of the invention is to provide a hand anemometer which indicates the direction of the wind as well as its velocity.

Another object of the invention is to provide means for accurately measuring the rate of flow of any or all gas movement. Other objects will appear as the description proceeds.

With the foregoing and other objects in view, the invention consists in the details of construction and combinations of parts hereinafter more fully described, and illustrated in the accompanying drawings, in which:—

Fig. 1 is a side elevation, partly in section;

Fig. 2 is an end elevation;

Fig. 3 is a diagrammatic illustration of the circuit arrangement;

Fig. 4 is a detail of the grid assembly;

Fig. 5 is a section taken on line 5—5 of Fig. 4;

Fig. 6 is a plan view of a modified form;

Fig. 7 is a side elevation of said modification, partly in section;

Fig. 8 is an end elevation of the same modification; and

Fig. 9 is a perspective view showing in part the essential structure of a milliammeter of the "suppressed zero" type.

In general, the apparatus consists preferably of a so-called hot wire grid in a series electrical circuit with battery, switch, suppressed zero milliammeter and rheostat. As will be described in detail hereinafter, the rate of flow of wind or gas across or through the hot wire grid determines the electrical conductivity of that grid. The electrical conductivity of the grid varies and regulates at any instant the current flow from the battery through the circuit and the current value is indicated by the pointer on the scale of a meter mechanism. The present invention contemplates the provision of means to compensate for irregular thermal response of the grid, and to give uniformly rectilinear indication of variations in the velocity of the air or other gaseous fluid. It should be noted that the term rectilinear indication is here employed to mean straight line indication, and the word rectilinear may be regarded as synonymous with linear. A milliammeter of the suppressed zero type affords one convenient means of accomplishing the desired end, although it is to be understood that other means may be employed successfully within the spirit and scope of the invention. It will be apparent that the scale of the milliammeter may be calibrated in any units desired, such as miles per hour, feet per second, etc.

By way of example, one form of grid assembly will be disclosed in connection with a preferred embodiment of the invention, but it will be apparent that our invention contemplates any type of construction using the hot wire principle. Referring to the drawings, the grid assembly comprises two conducting circular disks, shown as at 4 and 5 properly mounted upon and cemented or otherwise secured to a mica or other insulating disk 6. It will be noted that the central portion of this structure is circular in form and is in communication with the interior of a tube 7. Across the circular aperture of the grid structure there is wired a filament preferably in the from of a grid 3, nickel wire having a gauge diameter of .0004 inch being suitable in this instance. The necessary characteristics for this wire or filament are that it be physically strong for the diameter required, non-oxidizing upon being heated bright cherry red or approximately 1800° Fahrenheit in the normal atmosphere, or any gas in which it may be used, and that it have a high temperature coefficient in order that the variation in electrical resistance may be high upon variation in temperature. This wire is properly connected at its extremities to the terminal disks 4 and 5 at 8 and 9. It will be noted as hereinafter more fully disclosed, that upon connecting a battery or other source of potential to the terminal disks 4 and 5, a current will be caused to flow from the terminal disk 4, through the various convolutions of the grid wire to terminal disk 5, and return to current source.

Figure 3 illustrates the electrical circuit used in which 3 represents the hot wire grid, 10 a battery, 11 a switch, 12 a suppressed zero milliammeter, and 13 a rheostat. The wiring connecting these devices in series includes the leads 14, 15, 16, 17 and 18.

The suppressed zero milliammeter will now be described in order that its operation and function in this circuit may be clear. A characteristic of this type of instrument is that it provides an inactive period of predetermined range, during which a certain minimum value of current may flow through it without the needle registering. Within certain limits the zero value may be arbitrarily chosen as desired and the indicating range of the instrument regulated accordingly. For our purpose it will be assumed that this zero value is 70 milliamperes and therefore, all grid current values below 70 milliamperes will not be registered on the meter. The upper scale limit will be 90 milliamperes. The meter will, therefore, only register current values between 70 and 90 milliamperes. Such a meter may be designed in a number of different ways, several of which will be described. In an instrument using a D'Arsonval movement, the retractile springs may be biased sufficiently in design to provide for a suppressed zero range as desired. Another and preferable instrument for this application is the moving vane type of instrument which has been found suitable for the present invention and wherein the vane is so positioned with respect to the field, and is provided in such a way with proper retractile spring tension, that its movements are also in accordance with the suppressed zero characteristics. It is desired to state at this point that the characteristics of the moving vane type of instrument in conjunction with the characteristics of the hot wire grid combine to produce rectilinear or straight line response characteristics which are highly desirable. The combination is a further important feature of this invention, for whereas the response in the hot wire grid diminishes at the higher velocities of gas movement, if used in conjunction with a meter whose response is greater at higher current values, a means of compensation is thus provided over the upper range of movement of the gaseous fluid and the resultant performance of the combination is uniform or straight line.

Referring to Fig. 9, the features depicted comprise sufficient structure to disclose the means employed for the purposes of the present invention to give the meter mechanism suppressed zero characteristics. No effort has been made to illustrate the complete electrical circuit, since this is conventional. The single turn of wire D serves to indicate the moving coil of the instrument. The form of meter here shown is typical of the D'Arsonval movement, but the same principles may be applied to other types such as the moving vane. It will be noted that in order to bring out more clearly the features of such an instrument as adapted for the purposes of the present invention, there has been some departure from conventional methods of construction and proportioning of parts.

The instrument has been given suppressed zero characteristics by altering the tension on the reclaiming springs A and B. Normally, for this position of the needle, the two springs would be balanced at the zero position under their balanced forces. Here, however, spring A is wound much tighter than spring B and therefore exerts a greater torque on the needle shaft. It will be noted that the direction of winding of the springs is such that this excess torque is exerted in a counter-clockwise direction, tending to move the needle below the zero of the scale. The spring stop C has moved slightly under this force but still maintains the needle near the zero position. It will take a certain force, or torque, to again balance the needle at the zero position. This force must be in a clockwise direction. It is supplied by current flowing thru the coil of the meter. The value of the current necessary to balance the needle at zero represents the amount by which the zero of the meter has been suppressed. The zero of the scale no longer represents zero current, of course. For the purposes of the present invention, the old meter scale is replaced by a new one calibrated in miles of wind per hour rather than current.

The end shaping of the pole pieces has been indicated by both dotted and full lines. The dotted lines indicate the true shape of the pole pieces to produce a uniform magnetic field and, hence, uniform response of the meter. The full lines represent the actual shape of the pole pieces. This illustrates the principle of distortion of the field. It will be noted that for small currents and small angular displacements of the needle the field air gap is relatively wide, hence the field is relatively weak and the response of the needle small. The field air gap narrows toward the other end of the scale, however. When the coil is in this portion of the gap the field is relatively strong and the angular deflection of the needle correspondingly greater. This gives the meter current-deflection characteristics of a nature to compensate for the unequal velocity-current relations of the hot wire grid.

Referring further to Figure 3, upon closure of the switch 11, a current is caused to flow from battery 10 through lead 14 to grid 3 through the convolutions thereof to lead 18 and thence to rheostat 13 through lead 17 to the suppressed zero milliammeter 12, and return by lead 16, through switch 11 and lead 15 to battery. The value of the current in this circuit will depend upon the voltage of the battery and the resistance of the various elements of the circuit external thereto. This value may be adjusted as desired by the rheostat 13. The current for our descriptive purposes is adjusted to the value of 70 milliamperes. Under these circumstances the pointer of the suppressed zero milliammeter 12 registers zero and the grid wire 3 is heated a bright cherry red, or approximately 1800° Fahrenheit at normal radiation, that is, with grid wire shielded from any moving currents of air or gas. Under these circumstances, the resistance of the grid element due to the physical temperature coefficient of the material of which it is constructed, is higher than its resistance at any lower temperature. In this device the variation in resistance of the grid with temperature from 70° Fahrenheit to 1800° Fahrenheit is of the ratio of 1 to 3.

The original features of this invention then lie in the variation of resistance of the grid element with temperature of the grid as determined by the rate of flow of air or gas across that grid and as measured by the suppressed zero milliammeter calibrated previously in terms of the units desired, miles per hour, etc. The dissipation of heat from such a grid wire under the molecular bombardment of the passage of air or gas is in accord with definitely established physical conceptions which permit of ample theoretical determinations and need not be described in detail herein. Suffice it to say, the cooling of the grid depends upon the velocity of the air or gas across or through it at any instant and is independent of the direction. The combination of the grid element in a series electrical circuit with a suppressed zero milliammeter indicates directly the velocity of the wind or gas across or through the grid element.

Figures 1 and 2 portray a ready and convenient method of construction for such an anemometer in a form adaptable to be carried in an observer's hand, complete with all necessary elements toward its successful operation. The grid element 3 is mounted properly in a housing 19 of stream line contour. A tube 7 is provided through the housing, in such a manner that upon a variation in barometric pressure between the tube ends, 20 and 21, a current of air or gas is caused to flow through the tube. It will be apparent that upon closing the tube ends 20 and 21, the temperature of the grid will depend upon the electric current through it. At this time the needle 22 of the suppressed zero milliammeter 12 is adjusted to zero by means of rheostat arm 23. Upon removing the obstacles at the tube ends 20 and 21, the temperature of the grid depends on another factor which is the rate of movement of air or gas through the tube. This will have the effect of reducing the temperature of the grid and hence increasing its conductivity. The needle 22 of the suppressed zero milliammeter 12 will give a direct indication of this movement, inasmuch as the current through the milliammeter increases with an increase of conductivity of the grid.

The construction shown in Figure 2 comprises the grid 3 carried in tube 7, mounted in stream line housing 19 suspended by arm 24 on support and battery compartment, 25. The suppressed zero milliammeter is designated as 12, the rheostat as 13 with rheostat adjusting arm 23 and the control switch is shown at 11.

Figures 6, 7, and 8 illustrate an extension or modification of this invention to provide for a direct measurement of the velocity of the wind or gas movement, and further for an indication of the direction of the wind or gas movement by the incorporation of a vane. The grid assembly used in this instance takes a generally elliptical form and is mounted as shown in Figure 7, detail 26, the tube 7 positioned in housing 19 of stream line contour, bearings as at 27 and 28 being provided to permit orientation of the wind vane through 360°. The view shown in Figure 8 comprises grid 3, housing 19, support 29, rheostat 13, rheostat arm 23, suppressed zero milliammeter 12 and battery housing 25. Proper electrical connections, not shown, are provided from the grid element 3 of Figures 7 and 8 to the suppressed zero milliammeter 12, switch 11, rheostat 13, and battery 10, all as hereinbefore shown in the circuit diagram of Fig. 3. The operation of this extension is identical as described before with the additional feature of mounting the grid element in a rotatable wind vane member, a preferred form of which is a vane whose contour is of stream-lined form in a horizontal cross section. The overall length of said vane, in horizontal section, along its center line being hereinafter called the major axis and a line perpendicular to the major axis at the point of greatest width of the section being hereinafter called the minor axis. The vane member is mounted in such manner as to be rotatable about a vertical axis thru the intersection of its major and minor axes. This vertical axis is perpendicular to the plane of their intersection. The terms "major and minor axes" as hereinafter used, therefore, do not refer to axes of rotation. The instrument is also equipped with a compass 30, Fig. 6, which is mounted in the wind vane, housing 19, and rotates with this vane. By means of the compass and the rotatable vane wind direction data of the wind or gas, as well as velocity data, may be obtained.

It will be apparent that while the description has dealt mostly with one application, this device is valuable for many other applications. One of these applications which may be mentioned is the mounting of the grid element in a pipe line and by proper combination of the other elements of this invention, to read directly the rate of gas flow through that pipe line without restricting or limiting the gas flow in any manner.

It should be noted that where the word gas occurs herein, a non-inflammable gas is usually meant; but no unnecessary limitation is thus implied since the invention is capable of use in connection with any gas, provided care is taken to exclude the gas under test from an atmosphere with which it would form an explosive mixture, or tend to combine chemically when in contact with the hot wire grid.

Other applications and other modifications are contemplated within the scope of the present invention, as will be apparent to those skilled in the art. It is therefore to be understood that the embodiments herein disclosed are to be regarded as illustrative of the invention, and not restrictive, and the appended claims are to be construed broadly except as limitations may be necessary in view of the prior art.

We claim:—

1. An anemometer, comprising in combination an electrical circuit; means in said circuit thermally responsive to velocity changes of air flow; and a suppressed zero meter mechanism operative with said circuit and comprising means to give rectilinear response of said meter at all velocity ranges of air flow.

2. An anemometer, comprising in combination an electrical circuit; means in said circuit thermally responsive to variations in air flow; and means to compensate for irregular response of said thermal means comprising a meter mechanism having suppressed zero characteristics.

3. An instrument of the character described, comprising in combination an electrical circuit; means in said circuit thermally responsive to the rate of movement of a gaseous fluid; means to align said thermally responsive means directionally with the path of movement of said fluid to obtain maximum thermal response; and means comprising a suppressed zero meter mechanism operative with said thermally responsive means when so aligned to indicate a rectilinear response at all velocities of said movement.

4. An instrument for measuring velocity and indicating direction of movement of a gaseous fluid, comprising in combination an electrical circuit; a resistance element in said circuit thermally responsive to velocity changes of said fluid; means for directionally orienting said resistance element with the path of movement of said fluid to obtain maximum response of said element; and means comprising a suppressed zero meter mechanism operative with said circuit to give a uniformly rectilinear response at different velocities of fluid movement when said resistance element is directionally aligned with the path of movement of said fluid.

5. An anemometer for measuring velocity and indicating direction of air currents, comprising in combination an electrical circuit; resistance means in said circuit thermally responsive to velocity changes of said air currents; means for orienting said resistance centrally in the path of said currents to obtain maximum electrical response of said resistance; and compensating means comprising a suppressed zero meter mechanism operative with said circuit and adapted to give a uniform response and maximum indication when said resistance is aligned with the path of current flow at any given velocity.

6. An anemometer, comprising in combination an electrical circuit; thermal means in said circuit responsive to variations in gas flow; and means operative with said circuit to compensate for irregular response of said thermal means, comprising a meter mechanism provided with means to limit its indicating action to a predetermined extent.

7. An instrument for measuring velocity and indicating direction of air currents, having a fixed body component and a relatively movable component; an electrical circuit; a tubular member mounted in said movable component and rotatable through an arc of 360°; a resistance element in said circuit and positioned in said member for free movement therewith; means for directionally orienting said member in line with the flow of air current to permit maximum response of said resistance element, comprising a stream lined vane carrying said member and mounted on said body component for rotatable movement about an axis passing vertically through the intersection of the major and minor axes of said vane; and means comprising a meter mechanism operative with said circuit to give uniform linear response indications in accordance with changes in velocity of air current when said tubular member is in directional alignment with the said current.

8. In an instrument for measuring the velocity and indicating the direction of air currents, the combination with an electrical circuit, of a resistance element in said circuit responsive to variations in the velocity of said air currents; a tubular member in which said resistance is mounted; means for directionally orienting said tubular member in line with the path of flow of the air currents to permit maximum response of said resistance, said means comprising a stream-lined vane within which said tubular member is mounted in co-axial relation; bearings to permit rotatable movement of said vane through an arc of 360° about an axis passing vertically through the intersection of its major and minor axes; and means comprising a meter mechanism operative with said circuit to give linear response indications in proportion to velocity changes in said air currents.

GEORGE A. GRAHAM.
JAMES W. GOODIN.